US010975978B2

(12) United States Patent
Tamba (10) Patent No.: US 10,975,978 B2
(45) Date of Patent: Apr. 13, 2021

(54) SOLENOID DEVICE WITH SENSOR

(71) Applicant: BRT Group Pty Ltd, Castle Hill (AU)

(72) Inventor: Richard Terrence Tamba, Castle Hill (AU)

(73) Assignee: BRT Group Pty Ltd, Castle Hill (AU)

( * ) Notice: Subject to any disclaimer, the term of this patent is extended or adjusted under 35 U.S.C. 154(b) by 0 days.

(21) Appl. No.: 16/102,131

(22) Filed: Aug. 13, 2018

(65) Prior Publication Data

US 2018/0363798 A1    Dec. 20, 2018

Related U.S. Application Data

(63) Continuation of application No. 14/388,477, filed as application No. PCT/AU2013/000189 on Feb. 28, 2013, now abandoned.

(30) Foreign Application Priority Data

Mar. 27, 2012  (AU) ................................ 2012901235

(51) Int. Cl.
  *F16K 31/06*    (2006.01)
  *H01F 7/18*    (2006.01)
  (Continued)

(52) U.S. Cl.
  CPC ...... *F16K 31/0613* (2013.01); *F16K 11/0716* (2013.01); *F16K 37/005* (2013.01);
  (Continued)

(58) Field of Classification Search
  CPC .............. F16K 37/0041; F16K 37/005; F16K 31/0613; F16K 11/0716; G05D 16/2013;
  (Continued)

(56) References Cited

U.S. PATENT DOCUMENTS

| 4,133,511 A | 1/1979 | Hartmann et al. |
| 4,356,900 A | 11/1982 | Sommer |

(Continued)

FOREIGN PATENT DOCUMENTS

| CN | 1366155 A | 8/2002 |
| CN | 101111810 A | 1/2008 |

(Continued)

OTHER PUBLICATIONS

International Search Report for PCT/AU2013/000189, dated May 2, 2013; ISA/AU.

(Continued)

*Primary Examiner* — Craig J Price
(74) *Attorney, Agent, or Firm* — Harness, Dickey & Pierce, P.L.C.

(57) ABSTRACT

A solenoid device including pressure altering means for altering an output pressure of the solenoid device; and an actuator for providing an actuating signal to said pressure altering means; wherein the solenoid device further includes a sensor arranged to sense a control value of the solenoid device, and a controller which receives a request and is arranged to control delivery of power to the actuator with feedback from the sensor until the control value meets the request.

17 Claims, 7 Drawing Sheets

(51) Int. Cl.
    *F16K 37/00*     (2006.01)
    *G05D 16/20*     (2006.01)
    *F16K 11/07*     (2006.01)
    *G05D 7/06*     (2006.01)

(52) U.S. Cl.
    CPC ....... *F16K 37/0041* (2013.01); *G05D 7/0617* (2013.01); *G05D 16/2006* (2013.01); *G05D 16/2013* (2013.01); *G05D 16/2024* (2019.01); *H01F 7/1844* (2013.01); *Y10T 137/7737* (2015.04); *Y10T 137/7759* (2015.04); *Y10T 137/7761* (2015.04); *Y10T 137/8671* (2015.04)

(58) Field of Classification Search
    CPC ............. G05D 16/2006; G05D 7/0617; G05D 16/2024; H01F 7/1844; Y10T 137/8671; Y10T 137/7759; Y10T 137/7737; Y10T 137/7761
    USPC ............. 137/82, 625.6, 625.65, 625.66, 468, 137/625.49, 486, 487.5
    See application file for complete search history.

(56) References Cited

U.S. PATENT DOCUMENTS

| | | | |
|---|---|---|---|
| 4,488,574 | A | 12/1984 | Bartholomaus |
| 4,796,661 | A | 1/1989 | Hishinuma et al. |
| 4,860,787 | A | 8/1989 | Grosselin |
| 5,353,685 | A | 10/1994 | Snow |
| 5,469,877 | A | 11/1995 | Askew |
| 5,929,536 | A | 7/1999 | Stoll et al. |
| 6,116,269 | A | 9/2000 | Maxson |
| 6,155,233 | A | 12/2000 | Wade et al. |
| 6,892,114 | B1 | 5/2005 | Addink et al. |
| 7,383,851 | B2 | 6/2008 | Jacobsen et al. |
| 7,950,413 | B2 | 5/2011 | Fleischer et al. |
| 8,408,516 | B2 * | 4/2013 | Dlugoss ............. F16H 61/0251 251/129.04 |
| 8,413,678 | B2 | 4/2013 | Teichmann et al. |
| 9,151,396 | B2 | 10/2015 | Nalgirkar et al. |
| 9,810,342 | B2 | 11/2017 | Tamba |
| 2003/0070710 | A1 | 4/2003 | Lnayama et al. |
| 2003/0164193 | A1 | 9/2003 | Lou |
| 2004/0035476 | A1 | 2/2004 | Holmes et al. |
| 2005/0194052 | A1 | 9/2005 | Gandrud |
| 2008/0265190 | A1 | 10/2008 | Fleischer et al. |

FOREIGN PATENT DOCUMENTS

| | | |
|---|---|---|
| EP | 0233166 A2 | 8/1987 |
| EP | 1223372 A2 | 7/2002 |
| EP | 2336605 A2 | 6/2011 |
| JP | S62-109209 A | 5/1987 |
| JP | H10-107820 A | 4/1998 |
| JP | H10-504092 A | 4/1998 |
| JP | H10-258731 A | 9/1998 |
| JP | H11-141696 A | 5/1999 |
| JP | 2001-287630 A | 10/2001 |
| JP | 2004-001684 A | 1/2004 |
| JP | 2008-176774 A | 7/2008 |
| WO | WO-2011-100800 A1 | 8/2011 |

OTHER PUBLICATIONS

International Preliminary Report on Patentability (with annexes) for PCT/AU2013/000189, dated Jun. 23, 2014; IPEA/AU.

Translation of first Chinese Office Action dated Nov. 20, 2015 for Chinese Patent Application No. 201380027687.1, which claims priority to the same parent application, PCT/AU2013/000189, filed Feb. 28, 2013, as present application.

European Search Report and Search Opinion dated Nov. 23, 2015 for European Patent Application No. 13769671.2, which claims priority to the same parent application, PCT/AU2013/000189, filed Feb. 28, 2013, as the present application.

Translation of second Chinese Office Action dated Sep. 28, 2016 for Chinese Patent Application No. 201380027687.1, which claims priority to the same parent application, PCT/AU2013/000189, filed Feb. 28, 2013, as the present application.

Translation of first Japanese Office Action dated Feb. 7, 2017 for Japanese Patent Application No. 2015-502015, which claims priority to the same parent application, PCT/AU2013/000189, filed Feb. 28, 2013, as the present application.

\* cited by examiner

SOLENOID DEVICE WITH SENSOR

CROSS-REFERENCE TO RELATED APPLICATIONS

This application is a continuation of U.S. patent application Ser. No. 14/388,477 filed on Sep. 26, 2014, which is a 371 U.S. National Stage of International Application No. PCT/AU2013/000189, filed Feb. 28, 2013, which claims priority to Australian Application No. 2012901235, filed Mar. 27, 2012. The entire disclosures of the above applications are incorporated herein by reference.

FIELD

The present invention relates to a solenoid device and, more particularly but not exclusively, to a solenoid spool valve having an integrated pressure sensor which provides improved performance characteristics when the solenoid spool valve is used in a communications network of a vehicle or system.

BACKGROUND

A modern vehicle typically has a large number of electronic control units (ECU) for various subsystems. The biggest processor is commonly the engine control unit, however other ECUs are used for controlling other devices in the vehicle, such as the transmission, airbags, antilock braking system, cruise control, electric power steering, audio systems, windows, doors, mirror adjustment, battery and recharging systems for hybrid/electric cars, etc. Some of these form independent subsystems, but communications among others are essential. A subsystem may need to control actuators or receive feedback from sensors. The Controller-Area Network (CAN) is a standard vehicle bus or communications network devised to fill this need.

The applicant is aware that existing systems have sensors elsewhere on a hydraulic circuit for sensing pressure delivered by solenoid valves. The applicant has determined that such systems may be improved, at least in so far as performance and maintenance are concerned.

US 2008/0265190 relates to an electromagnetic pressure regulating valve device having an integrated pressure sensor, however this document relates to a transducer, not to a high-flow direct acting pressure regulating solenoid device. US 2003/0070710 discloses a fluid pressure regulator, however these are for a system of feed and bleed solenoids joined together to achieve a pressure result and having their outputs combined and measure and fed back into the control system. U.S. Pat. No. 5,469,877 discloses an electric to pneumatic transducer for a set of pilot solenoids, however it does not relate to direct acting, high-flow controls as it requires an additional valve to do the work based on what the pilot valves tell the additional valve to do.

The applicant has also identified that current design high flow solenoids have an equal area spool, meaning that lands of the spool have the same external dimension, usually the outside diameter, resulting in the lands having the same surface area for driving the spool in response to fluid pressure against the lands. To increase the pressure obtained from the current design solenoid spool valves requires the spool diameter to be increased. As the diameters of each of the lands on the spool increase, the force against a diaphragm of the solenoid spool valve increases, necessitating a magnet (coil) size of an electromagnetic actuator to be increased!. The applicant has determined that it would be desirable to obviate the necessity to increase the magnet (coil) size with pressure capacity of the solenoid spool valve.

Furthermore, the applicant has also identified that increasing diameters of all lands on the spool in accordance with current practice typically increases leakage to an exhaust port of the solenoid spool valve, requiring a larger pump to compensate for the leakage.

Examples of the invention seek to solve, or at least ameliorate, one or more disadvantages of previous solenoid spool valves.

SUMMARY

In accordance with the present invention, there is provided a solenoid device including pressure altering means for altering an output pressure of the solenoid device; and an actuator for providing an actuating signal to said pressure altering means; wherein the solenoid device further includes a sensor arranged to sense a control value of the solenoid device, and a controller which receives a request and is arranged to control delivery of power to the actuator with feedback from the sensor until the control value meets the request.

Preferably, the solenoid device is a solenoid spool valve including a spool valve having a sleeve provided with a supply port, a control port, and a spool supported in the sleeve for axial displacement within the sleeve; and an electromagnetic actuator for providing an axial drive force to said spool in a first axial direction; wherein the solenoid spool valve further includes a sensor arranged to sense a control value of the spool valve, and a controller which receives a request and is arranged to control delivery of power to the electromagnetic actuator with feedback from the sensor until the control value meets the request.

More preferably, the sensor is a pressure sensor, the supply port is a supply pressure port, the control port is a control pressure port, the control value is a control pressure, the request is in the form of a pressure request, and the controller controls delivery of power to the electromagnetic actuator with feedback from the pressure sensor until the control pressure meets the pressure request.

Preferably, the controller is in the form of a control circuit. More preferably, the control circuit is arranged to receive the pressure request from a communications network. Even more preferably, the communications network is a Controller-Area Network.

Preferably, the pressure sensor is arranged to sense the control pressure of the spool valve at a location inside the sleeve.

In a preferred form, the controller is arranged to adaptively learn current provided to the electromagnetic actuator in relation to pressure sensed, such that the solenoid spool valve is self-compensating.

Preferably, the controller is mounted relative to the sleeve.

It is preferred that the solenoid spool valve including the pressure sensor and controller are provided as a unitary module.

Preferably, the solenoid spool valve further includes an exhaust port, the spool has a first piston with a first land for opening/closing the supply pressure port and a second piston with a second land for opening/closing the exhaust port, wherein the first piston has a larger piston face surface area in fluid communication with the control pressure port than does the second piston.

Preferably, the first piston has one piston face (b) in fluid communication with the control pressure port arranged such that force of fluid against said one piston face acts on the spool in an axial direction away from the electromagnetic actuator, and an opposite piston face (a) in fluid communication with a feedback orifice arranged such that force of fluid against said opposite piston face acts on the spool in an axial direction toward the electromagnetic actuator.

More preferably, the feedback orifice supplies fluid at the same control pressure as the control pressure port. Even more preferably, the feedback orifice is in fluid communication with the control pressure port. In one example, the orifice is formed as a duct extending through the first piston to communicate with the control pressure port.

Preferably, the face (c) of the second piston in fluid communication with the control pressure port is arranged such that force of fluid against said face acts on the spool in an axial direction toward the electromagnetic actuator.

Preferably, the spool is arranged such that, the combined force on the spool from fluid against piston faces of the spool is independent of the transverse extent of the first piston, owing to equal and opposite face: surface areas of the first piston. More preferably, the first piston is cylindrical and the combined force on the spool from fluid against piston faces of the spool is independent of an outside diameter of the first piston.

Preferably, the spool is arranged such that, the combined force on the spool from fluid against piston faces of the spool is given by the equation:

combined force=$A+C-B$, where A, B and C are the fluid forces acting on faces a, b and c, respectively.

In a preferred form, the first piston has a larger diameter than the second piston. More preferably, as a result of the larger diameter of the first piston, the valve has relatively high flow from the supply pressure port to the control pressure port and relatively low flow from the control pressure port to the exhaust port.

In accordance with another aspect of the present invention, there is provided a range of solenoid spool valves, each of which is as described above, wherein each of the solenoid spool valves has a different first piston diameter to second piston diameter ratio to provide different pressure capabilities, and wherein each of the solenoid spool valves has an identical electromagnetic actuator.

In one particular example, each of the solenoid spool valves has a different first piston diameter, and the same second piston diameter.

However, a learned person can appreciate that the technology described herein does not need to be limited to solenoids having spool valves and could be incorporated into other solenoid types that can alter pressure through other control means, for example, by controlling the exhausting of oil from a control chamber, fed by a controlled source, i.e. an orifice, in a controlled manner, thus effecting pressure control. The integration of the pressure sensor and controls in this case would be key to the repeatable pressure output from this previously non-self-regulating system/solenoid.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
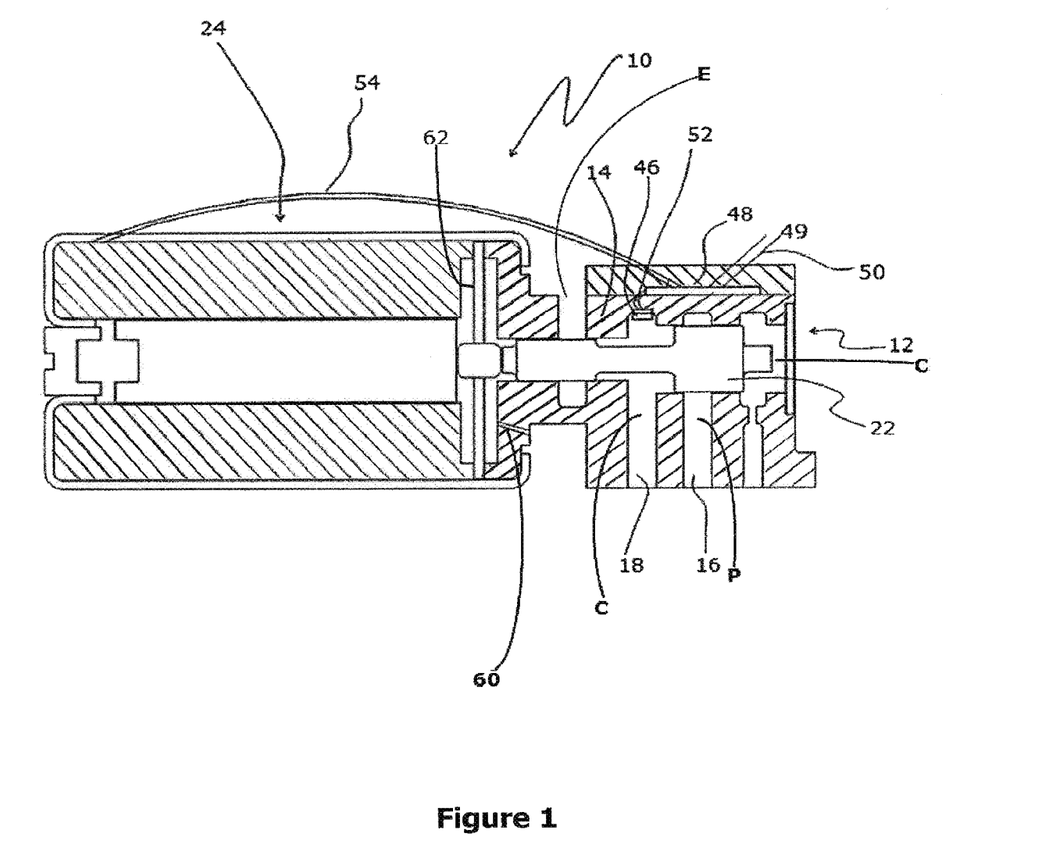
FIG. 1 is a solenoid spool valve with pressure sensor in accordance with an example of the present invention.

With reference to FIG. 1 of the drawings, there is, provided a solenoid spool valve 10 used for supplying varying pressures from a system supply pressure to an object (such as, for example, a friction clutch). The solenoid spool valve 10 is advantageously provided with a pressure sensor 46 and a controller 48 to achieve improved performance/convenience when used in a communications network such as a Controller Area Network (CAN).

More specifically, the applicant has determined that existing systems typically use a sensor elsewhere on a hydraulic circuit, separate to the solenoid spool valve. The applicant has determined that such arrangements are disadvantageous, particularly when it comes to rebuilding and maintenance. Specifically, as existing systems supply the solenoid spool valve with a current and use an external pressure sensor to sense pressure achieved by the solenoid spool valve, components of the system separate to the solenoid spool valve may have to adapt to wear of the solenoid spool valve as it may deteriorate over time and change its characteristics. Then, when the solenoid spool valve is replaced with a fresh solenoid spool valve, the remainder of the system must re-learn to accommodate the new solenoid spool valve which has different characteristics to the replaced solenoid spool valve. The: applicant has determined that it would be advantageous for there to be provided a solenoid spool valve which has its own pressure sensor and controller such that the solenoid spool valve is sent a pressure request rather than a current, as is typical in existing systems. In this way, the components of the system external to the solenoid spool valve do not need to compensate for the change in characteristics of the Solenoid spool valve which are dealt with internally of the solenoid spool valve by virtue of its ability to be self-compensating. The pressure sensor 46 is in the control pressure circuit of the solenoid spool valve 10, and there is feed from the CAN 49 such that an input pressure may be requested and controlled at the source of the signal (i.e. within the solenoid). The pressure signal is fed back to the solenoid controller 48 from the pressure sensor 46.

More specifically, the solenoid spool valve. 10 includes a spool valve 12 having a sleeve 14 provided with a supply pressure port 16, a control pressure port 18 and a spool 22 supported in the sleeve 14 for axial displacement within the sleeve 14. The solenoid spool valve 10 also includes an electromagnetic actuator 24 for providing an axial drive force to the spool 22 in a first axial direction away from the electromagnetic actuator 24 so as to operate the spool valve 12. The solenoid spool valve 10 further includes the pressure sensor 46 arranged to sense a control pressure of the spool valve 12, and the controller 48 which receives a pressure request and is arranged to control delivery of power to the electromagnetic actuator 24 with feedback from the pressure sensor 46 to meet the pressure request.

The controller 48 may receive the pressure request from the communications network by way of communication means such as, for example, communication wires 50. Similarly, the pressure sensor 46 may be coupled in communication with the controller 48 by way of communication wires 52. The controller 48 shown in FIG. 1 supplies power to the electromagnetic actuator 24 by way of power lines 54. However, an alternative to this arrangement can be the combining of the power and CAN wires in that the CAN signal 5 is "injected" on top of the power wires thus requiring only 2 wires to be connected to the solenoid assembly.

In the example shown, the pressure sensor 46 is located in a cavity of the sleeve 14 near a bore of the spool valve 12 so as to sense the pressure of fluid (gas or liquid) in the control pressure circuit in communication with the control pressure port 18. The controller 48 is mounted relative to the sleeve 14 and may be arranged to adaptively learn current provided to the electromagnetic actuator 24 in relation to pressure sensed by the pressure sensor 46, such that the solenoid spool valve 10 is self-compensating.

Advantageously, as the solenoid spool valve 10 including the pressure sensor 46 and controller 48 is provided as a unitary module, the entire module is able to be replaced at the end of its life without any need for an external controller to adapt to the new unit as it performs its own conversion of the desired pressure to the power requirements of the electromagnetic actuator 24.

Figure 2A:
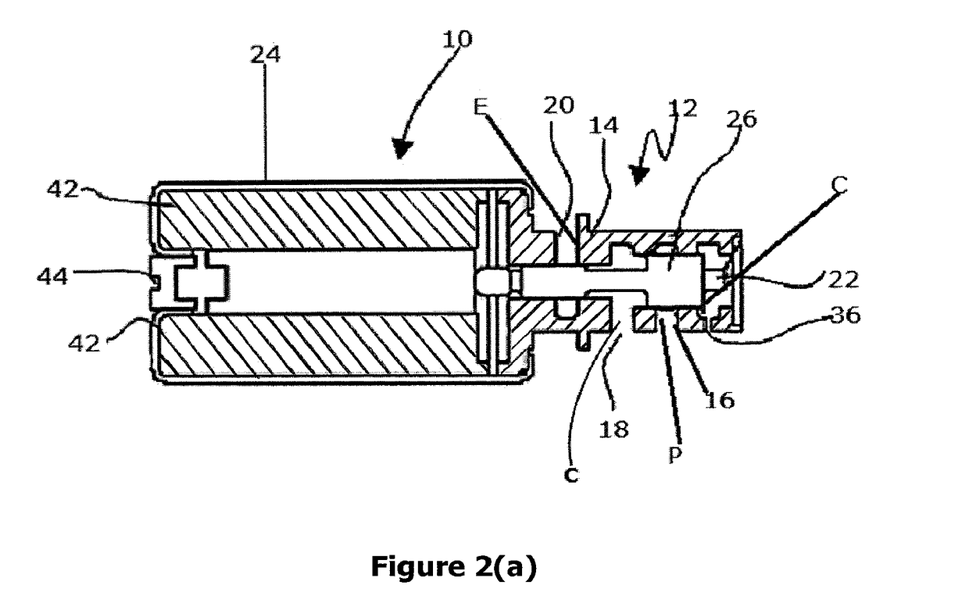
FIG. 2(a) is a diagrammatic cross-sectional view of a solenoid spool valve in accordance with a first example.

In the example shown in FIG. 1, the solenoid spool valve 12 is a two land high flow solenoid spool valve which enables higher control pressures to be used without necessitating a correspondingly larger electromagnetic actuator. A similar solenoid spool valve 12 is shown in FIG. 2(a), and is described below. In the subsequent figures, there are shown examples of alternative solenoid spool valves 12 which may also be adapted to include a pressure sensor 46 and controller 48 in the manner shown in FIG. 1 so as to embody alternative configurations of the present invention.

With reference to FIG. 2(a) there is shown a solenoid spool valve 10 used for supplying varying pressures from a system supply pressure to an object (such as, for example, a friction clutch). The solenoid spool valve 10 shown has an increased supply pressure diameter of the spool while leaving the regulated pressure end of the spool at the original diameter. By virtue of this configuration, the resultant force on a diaphragm of the valve 10 is independent of the increased supply pressure diameter.

More specifically, the solenoid spool valve 10 includes a spool valve 12 having a sleeve 14 provided with a supply pressure port 16, a control pressure port 18, an exhaust port 20 and a spool 22 supported in the sleeve 14 for axial displacement within the sleeve 14. The solenoid spool valve 10 also includes an electromagnetic actuator 24 for providing an axial drive force to the spool 22 in a first axial direction away from the electromagnetic 10 actuator so as to operate the spool valve 12. The spool 22 has a first piston 26 with a first land 28 for opening/closing the supply pressure port 16, and a second piston 30 with a second land 32 for opening/closing the exhaust port 20. The first piston 26 has a larger piston face surface area 34 in fluid communication with the control pressure port 18 than does the second piston 30.

Also with reference to FIG. 1, a controlled oil fill is provided at reference numeral 60. Although not shown, a similar controlled oil fill is provided in each of the solenoid spool valves 10 shown in FIGS. 2(a) to 2(d). The electromagnetic actuator 24 has a sealing diaphragm shown by reference numeral 62, and each of the solenoid spool valves 10 shown in FIGS. 2(a) to 2(d) have a common magnet size of the magnet shown at reference numeral 42. In FIGS. 1 to 2(d), P represents "system supply pressure", C represents "control (regulated) pressure", and E represents "exhaust". In FIG. 2(a) the solenoid spool valve 10 has dual area feedback as control pressure is applied to opposite sides of the first piston 26.

The first piston 26 has one piston face (b) in fluid communication with the control pressure port 18, arranged such that force of fluid against the face (b) acts on the spool 22 in an axial direction away from the electromagnetic actuator 24. The first piston 26 also has an opposite piston face (a) in fluid communication with a feedback orifice 36 arranged such that force of fluid against the opposite piston face (a) acts on the spool 22 in an axial direction toward the electromagnetic actuator 24. The feedback orifice 36 supplies fluid at the same control pressure as the control pressure port 18. In the example shown in FIG. 2(a), the feedback orifice 36 is formed in the sleeve 14 so as to provide fluid at the control pressure to piston face (a) of the first piston 26.

Figure 2B:
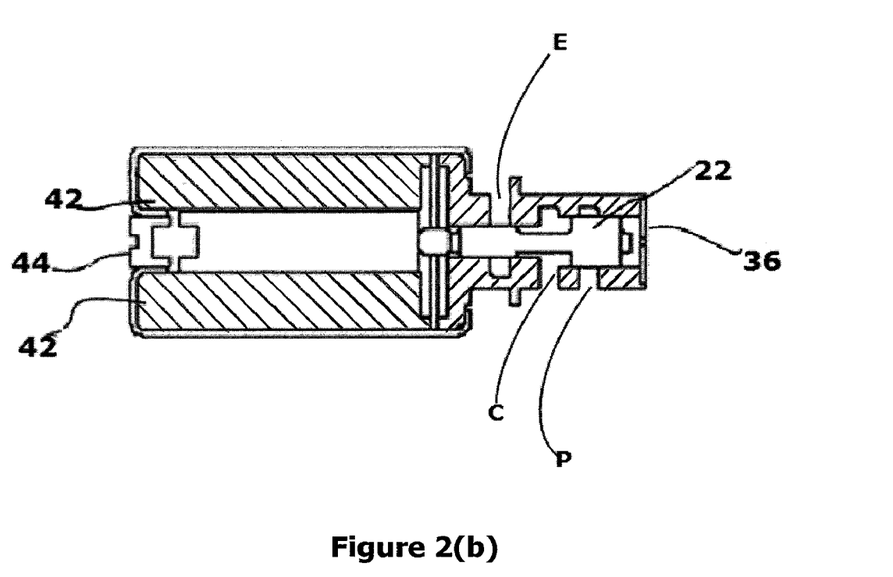
FIG. 2(b) is a diagrammatic cross-sectional view of a solenoid spool valve in accordance with a second example.
Figure 2C:
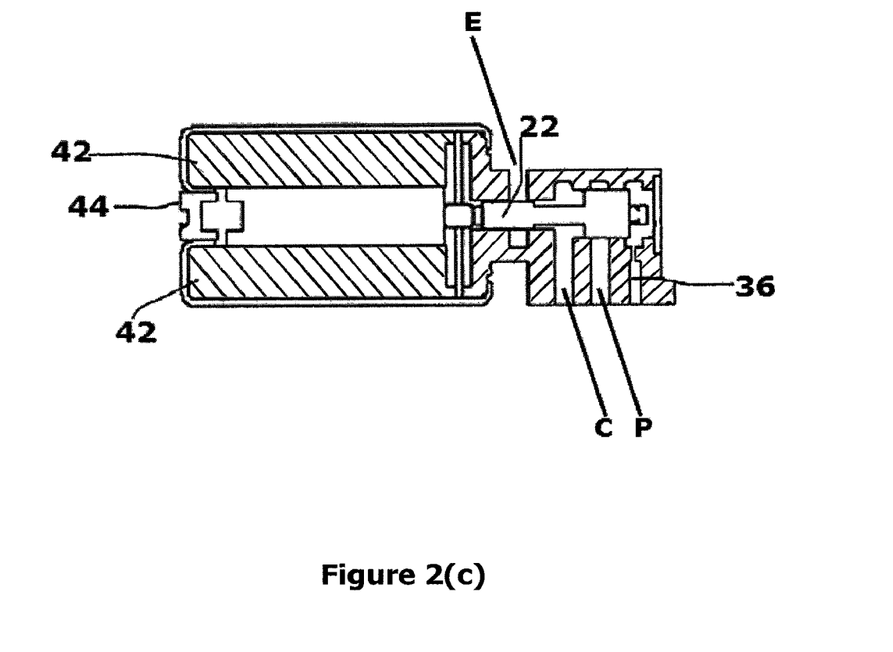
FIG. 2(c) is a diagrammatic cross-sectional view of a solenoid spool valve in accordance with a third example.
Figure 2D:
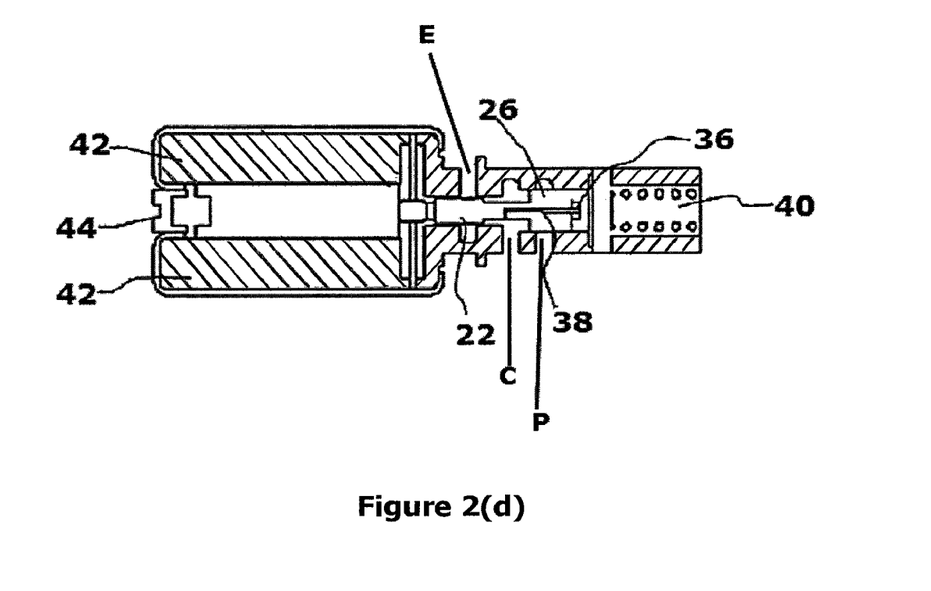
FIG. 2(d) is a diagrammatic cross-sectional view of a solenoid spool valve in accordance with a fourth example.

FIGS. 2(b) to 2(d) show alternative configurations of solenoid spool valves 10 in accordance with other examples of the present invention, having different feedback orifice options. More specifically, with reference to FIG. 2(b), the solenoid spool valve 10 shown in this example is similar to the example shown in FIG. 2(a), except in that the feedback orifice 36 is located in an end of the spool valve 12, rather than in a side wall of the sleeve 14. With reference to the example shown in FIG. 2(c), the feedback orifice 36 is provided in a sidewall of the sleeve 14 (in a manner similar to that in FIG. 2(a)), however this example differs in that the sleeve 14 is non-circular, in contrast to the examples in FIGS. 2(a), 2(b) and 2(d). This is made evident by the cross-sectional depiction of the sleeve 14 in FIG. 2(c), wherein the sleeve 14 extends to a greater degree below the spool 22 than it does above the spool 22, the sleeve 14 in FIG. 2(c) also having a reduced number of ports.

The solenoid spool valve 10 shown in FIG. 2(d) has a feedback orifice 36 formed as a duct 38 extending through the first piston 26 to communicate with the control pressure port 18. Also, the example shown in FIG. 2(d) incorporates a damper 40 as part of the solenoid spool valve 10. As can be seen, the size of the magnet 42 is common to all four versions of the solenoid spool valve 10 shown in FIGS. 2(a) to 2(d), as all four versions use an identical electromagnetic actuator 24. Accordingly, there is a relatively low cost of manufacture. Mounting options for the solenoid spool valves 10 of FIGS. 2(a) to 2(d) include high flow, an internal feedback option and an internal damper option, with the dual area feedback allowing a pressure increase with a common magnet.

In each of the solenoid spool valves 10 shown in FIGS. 2(a) to 2(d), the face (c) of the second piston 30 in fluid communication with the control pressure port 18 is arranged such that force of fluid against that face (c) acts on the spool 22 in an axial direction toward the electromagnetic actuator 24.

Figure 3:
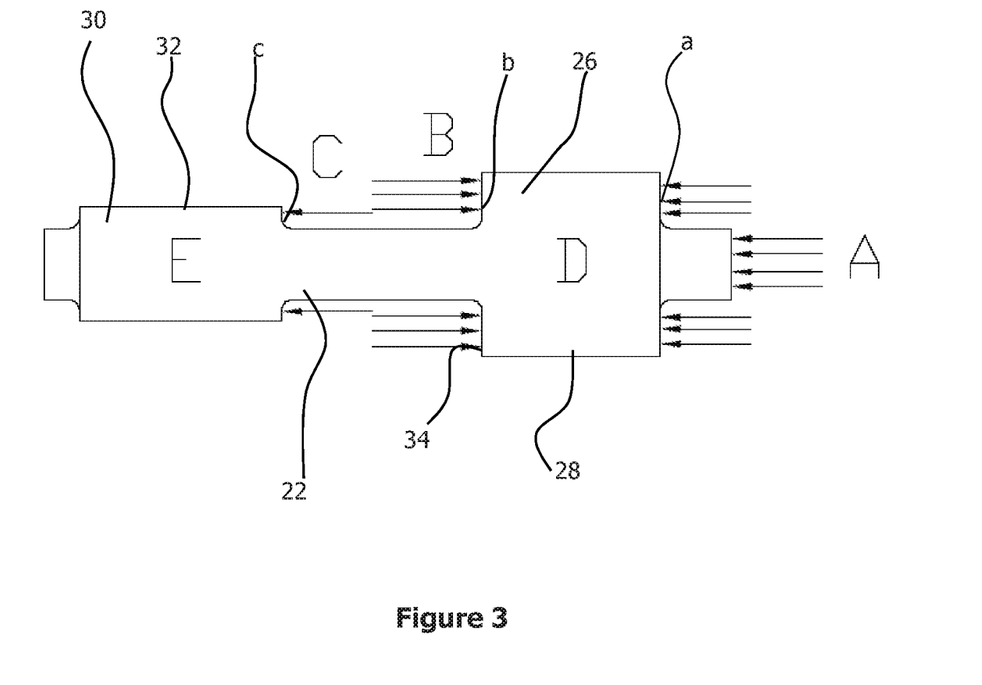
FIG. 3 shows detail of a spool of a solenoid spool valve the same or similar to those shown in FIGS. 2(a) to 2(d)

With reference to FIG. 3, the spool 22 is arranged such that, for any stationary position of the spool valve (including when the supply pressure port 16 of the solenoid spool valve 10 is closed as shown), the 'combined force on the spool 22 from fluid against piston faces of the spool 22 is independent of the transverse extent of the first piston 26. This independence is due to equal and opposite face surface areas of the first piston 26, which effectively cancel each other. Where the first piston 26 is cylindrical, the combined force on the spool 22 from fluid against piston faces of the spool 22 is independent of an outside diameter of the first piston 26. With regard to the lettering shown in FIG. 3, the combined force on the spool 22 from fluid against piston faces of the spool 22 is given by the equation:

Combined force=A+C−B, where A, B and C are the fluid forces acting on faces (a), (b) and (c), respectively.

In this way, the force on the annular part of surface (a) represented by the six outermost arrows of A cancel out the forces on surface (b) represented by the six arrows of force B, such that the combined force is truly independent of the outside diameter of the first piston 26.

Where the spool is cylindrical, the first piston 26 has a larger diameter than the second piston 30 so that the first piston 26 has a larger piston face surface area in fluid communication with the control pressure port 18 than does the second piston 30. As a result of the larger diameter of the first piston 26, the valve 10 has relatively high flow from the supply pressure port 16 to the control pressure port 18 and relatively low flow from the control pressure port 18 to the exhaust port 20. This is desirable, as the relatively low flow from the control pressure port 18 to the exhaust port 20 minimizes leakage such that a smaller pump may be used.

Advantageously, the ability to increase the diameter of the first piston 26 enables higher control pressure to be used, assisting in the regulation of higher pressures and facilitating quick action of the solenoid spool valve 10. Also, as the size of magnet 42 is independent of the flow area design, the pressure can be adjusted by varying the diameter of the first piston 26 while maintaining a common coil/core size between pressure/flow variants. This may assist in maintaining an overall short length when compared with other high flow solenoids, and facilitates the provision of a family of solenoid designs using a common magnet coil/core and body.

The tuneable feedback orifice 36 may have a maximised effect by being located to cooperate with the largest area of the spool 22.

The solenoid spool valve 10 may have a filled canister whereby oil is provided inside the electromagnetic actuator to change the natural frequency of the solenoid spool valve 10. Also, a trimming screw 44 may be mounted as shown in FIGS. 2(*a*) to 2(*d*).

Figure 4:
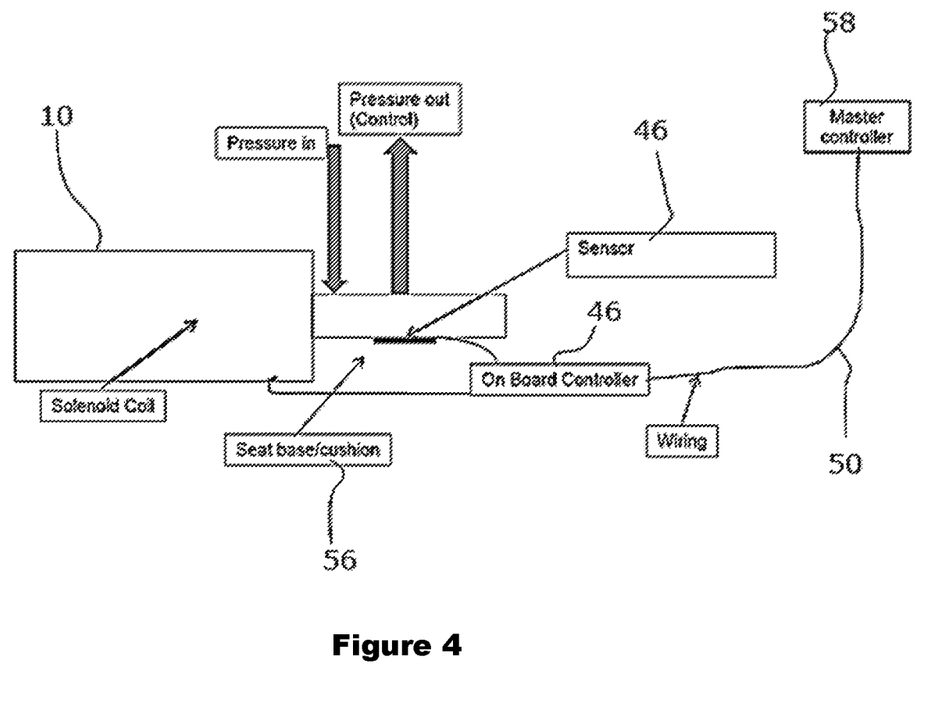
FIG. 4 is a diagrammatic view of an example system incorporating a solenoid spool valve in accordance with the invention.

With reference to FIG. 4, there is shown a diagrammatic view of an example system incorporating a solenoid spool valve 10 in accordance with the invention. In the example shown, the solenoid spool valve 10 is used in combination with a seat base/cushion 56 to control operation of the seat base/cushion. In particular, the solenoid spool valve 10 receives information from a sensor 46 via an on board controller (OBC) 48. In an example, the sensor 46 may be located over a control port. The OBC is connected by wiring to a master controller 58.

Figure 5:
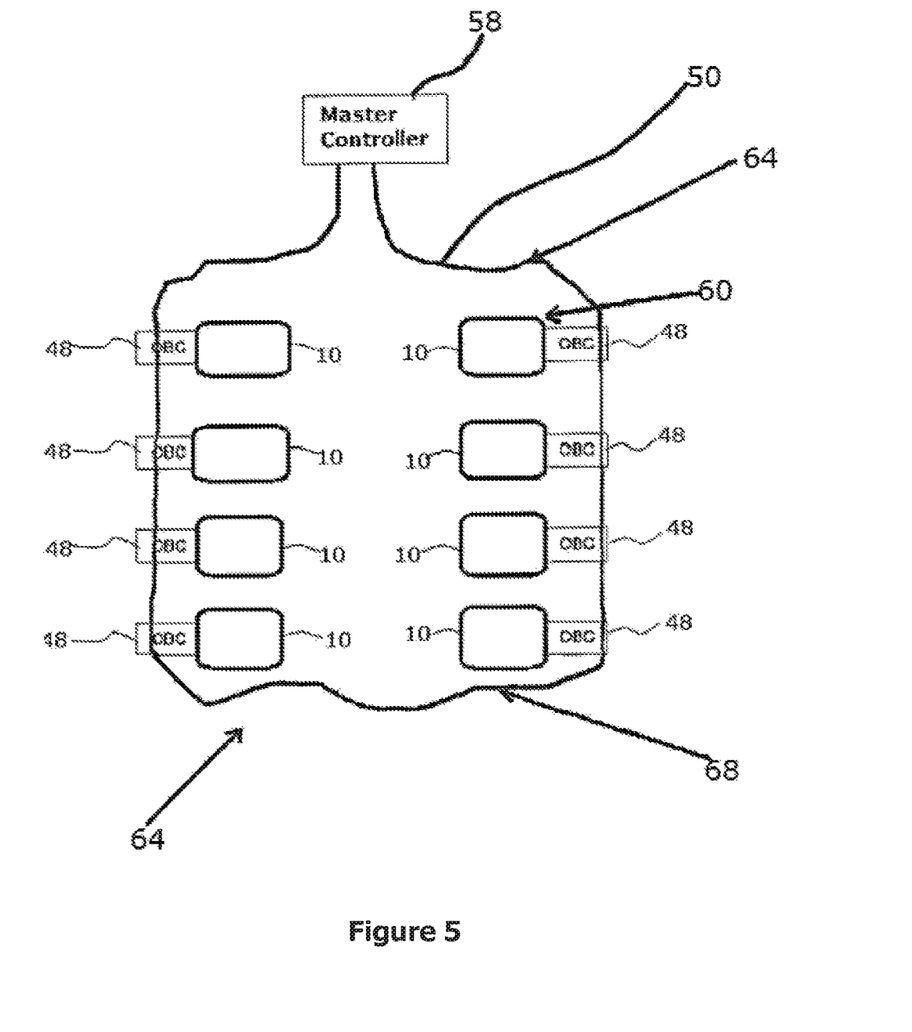
FIG. 5 is a diagrammatic view of another example system incorporating a plurality of solenoid spool valves in accordance with the invention.

FIG. 5 shows an example system incorporating a plurality of solenoid spool valves 10, each of which is provided with a separate OBC 48, and an individual identifier such that the individual solenoid spool valves 10 are able to be operated individually. The solenoid spool valves 10 are connected by communication wires 50. The communication wires 50 can be a combination of the power and CAN wires such that the CAN signal is "injected" on top of the power wires thus requiring only two wires to be connected to each solenoid assembly. As the communication wires 50 connect to the master controller 58 in an endless loop, this allows for continued power and CAN communication from either direction in the even that a wire or connection is faulty, thus making the system more robust and failsafe. In FIG. 5, reference numeral 64 indicates the vehicle/engine/transmission and reference numeral 66 represents CAN and power wires. At 66, there are provided solenoids with unique identification but of the exact same construction (OBC represents On Board Controller on the solenoid). At 68, there is represented the wiring for the CAN and power. The vehicle wiring can go all the way around, allowing for continued power and CAN communication from either direction in the event that a wire or connection is faulty, thus making the system more robust and failsafe.

Figure 6:
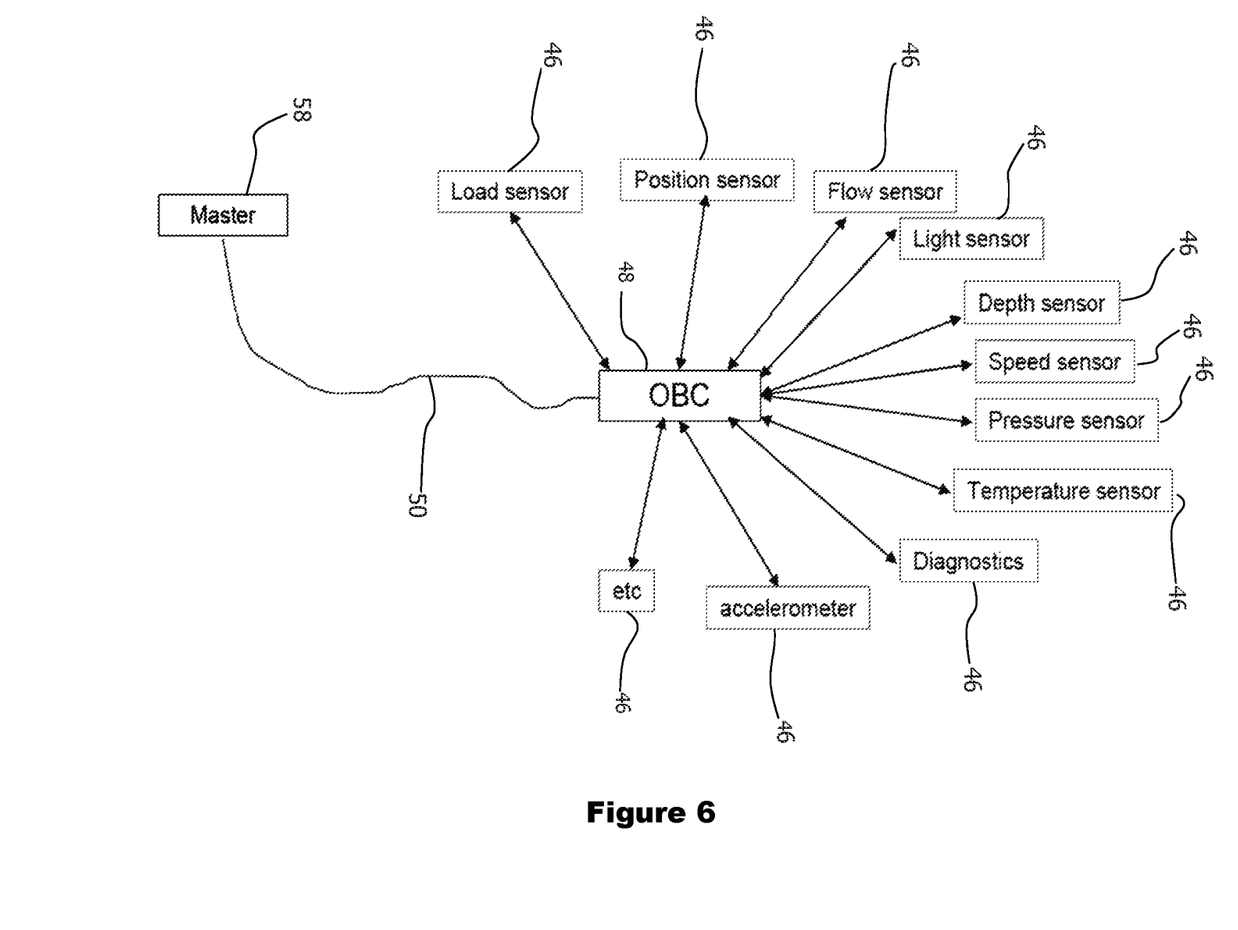
FIG. 6 is a diagram showing an on board controller with a series of possible CAN nodes.

FIG. 6 shows an OBC 48 of a solenoid spool valve 10 with a series of possible CAN nodes that could be used by the OBC 48 to measure responses. More specifically, the diagram shows a range of different sensors 46 that could be used by the OBC 48 to measure responses, depending on the nature of the request quantity type which is received by the OBC 48. In each case, the sensor 46 is arranged to sense a control value of the spool valve, and the OBC 48 receives a request and is arranged to control delivery of power to the electromagnetic actuator of the solenoid spool valve 10 with feedback from the sensor 46 until the control value meets the request.

While various embodiments of the present invention have been described above, it should be understood that they have been presented by way of example only, and not by way of limitation. It will be apparent to a person skilled in the relevant art that various changes in form and detail can be made therein without departing from the spirit and scope of the invention. Thus, the present invention should not be limited by any of the above described exemplary embodiments.

The CAN solenoid spool valve (CS) of examples of the present invention is the combination of several technologies into one device that enables that device to:

self control its own pressure output based on a CAN signal from a master controller;

be self compensating for wear;

be self compensating for changes in ambient conditions (i.e. temperature, pressure, fluid viscosity, leakage); and be able to be commonised and calibrated according to customer requirements by simple programming.

In one variation of the design the CS includes a solenoid spool valve having the ability to produce varied pressure outputs, with the integration of a pressure sensor into the control port and a small on-board controller that is supplied power and a CAN signal from a master controller and is able to drive the solenoid spool to achieve the desired pressure output independent of wear, leakage, temperature and inlet pressure to achieve the desired result.

In another variation of the design the CS includes a solenoid spool valve having the ability to produce varied flow outputs, with the integration of a flow sensor into the control port and a small on-board controller that is supplied power and a CAN signal from a master controller and is able to drive the solenoid spool to achieve the desired flow output or speed independent of wear, leakage, temperature and inlet pressure to achieve the desired result.

In another variation of the design the CS includes a solenoid spool valve having the ability to produce varied flow outputs, with the integration of a temperature sensor into the control port and a small on-board controller that is supplied power and a CAN signal from a master controller and is able to drive the solenoid spool to achieve the desired temperature independent of wear, leakage, temperature and inlet pressure to achieve the desired result (i.e. coolant control valve).

In yet another variation of the design the CS includes a solenoid spool valve having the ability to produce varied flow outputs, with the integration of a speed sensor to measure engine speed and a small on-board controller that is supplied power and a CAN signal from a master controller and is able to drive the solenoid spool to achieve the desired speed output independent of wear, leakage, temperature and inlet pressure to achieve the desired result.

In still another variation of the design the CS includes an actuator motor having the ability to produce position control, the integration of a position sensor to the output and a small on-board controller that is supplied power and a CAN signal from a master controller and is able to drive the actuator to achieve the desired position independent of wear, leakage, temperature and voltage supply.

The-CS controller is connected to power and can be interconnected to the master controller via CAN as separate wires, or can also be linked via CAN-Over-Power, radio links, Bluetooth or otherwise as examples. The CS can also use other sensors already existing on the CAN to effect the desired results and monitor its performance.

The CS would automatically adjust itself to wear over its lifetime and adjust itself to suit its environment.

The CS can be "labelled" to have a distinguishing number or identifier so that many solenoids of the same type can be used on the same CAN line where only the identifier is different so that each solenoid has its own unique ID address so that when CAN requests a pressure change, it could ask each solenoid individually to perform the change as requested and when requested.

Using an example of a CS controlling pressure, the following is offered:

(i). Ignition is turned on in vehicle and engine is started
(ii). Driver engages Drive gear
(iii). Master controller sends a signal to the solenoid via CAN requesting a ramp up of pressure over time to effect a smooth engagement of drive gear in the transmission
(iv). The solenoid self regulates the pressure at the desired increasing rate as instructed, compensating for wear, leakage and temperature to achieve the desired rate of change of pressure
(v). Once the function is completed, the solenoid sends a signal back over CAN to the master controller to confirm the function requested has completed, or, the solenoid is unable to complete the task and the reason e.g. pressure too low, pressure too high, etc (error message whereby the Master controller adopts a failsafe mode)

Variations of the invention include but are not limited to:
(a) An Idle Air Control Solenoid for Internal Combustion Engines with an integrated speed sensor and controller that will adjust air bleed bypass to the engine at idle to control idle speed at the request of the engine ECU over CAN. The idle air solenoid would automatically adjust the airflow to achieve the desired engine idle speed based on its own integrated speed sensor.

(b). A centre-neutral logic control solenoid that would control hydraulic oil in industrial/mining machines where the integrated sensor(s) and controller would perform the dual purpose of providing control pressure to the correct pressure port as directed via CAN (left on or right on) and would feed back information to the main machine control unit if the incorrect pressure has been achieved, or if there is pressure caused by leakage into the control circuit that has not been requested by the solenoid controller, thus enabling a safety shutdown of the machine due to unplanned/uncommanded actions.

(c). Any device that requires flow control, speed control or position control that is normally controlled via the supplying of current or voltage to the device to achieve control whereby the resulting feedback is not monitored and corrected for at the device itself by the use of integrated sensors and local control.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavor to which this specification relates.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers, or steps.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:
1. A self-compensating solenoid spool valve comprising:
a spool valve for altering an output pressure of the solenoid spool valve;
an actuator for providing an actuating signal to said spool valve;
a pressure sensor; and
a controller;
wherein the solenoid spool valve is in the form of a module, including the spool valve, the actuator, the pressure sensor and the controller;
wherein the spool valve includes a sleeve provided with a supply port, a control port, and a spool supported in the sleeve for axial displacement within the sleeve;
wherein the actuator is an electromagnetic actuator for providing an axial drive force to said spool in a first axial direction;
wherein the pressure sensor is arranged to sense a pressure control value of the spool valve;
wherein the controller receives a pressure request and controls delivery of power to the electromagnetic actuator with feedback from the pressure sensor thereby controlling movement of the spool until the pressure control value meets the pressure request, the controller adaptively learning delivery of power to the electromagnetic actuator in relation to the pressure control value sensed by the pressure sensor such that the solenoid spool valve self-compensates as the solenoid spool valve wears.

2. The solenoid spool valve as claimed in claim 1, wherein the controller is in the form of a control circuit.

3. The solenoid spool valve as claimed in claim 2, wherein the control circuit is arranged to receive the pressure request from a communications network.

4. The solenoid spool valve as claimed in claim 1, wherein the communications network is a Controller-Area Network.

5. The solenoid spool valve as claimed in claim 3, wherein the solenoid spool valve is arranged to use other sensors already existing on the communications network.

6. A plurality of self-compensating solenoid spool valves as claimed in claim 3, wherein each one of the self-compensating solenoid spool valves is arranged to receive a separate pressure request from the communications network and each one of the self-compensating solenoid spool valves has a unique identifier to enable said each one of the self-compensating solenoid spool valves to be identified, addressed and operated individually.

7. The solenoid spool valve as claimed in claim 1, wherein the pressure sensor is arranged to sense the pressure control value of the spool valve at a location inside the sleeve.

8. The solenoid spool valve as claimed in claim 1, wherein the controller is mounted relative to the sleeve.

9. The solenoid spool valve as claimed in claim 1, wherein the solenoid spool valve further includes an exhaust port, the spool has a first piston with a first land for opening/closing the supply pressure port and a second piston with a second land for opening/closing the exhaust port, wherein the first piston has a different piston face surface area in fluid communication with the control port than does the second piston.

10. The solenoid spool valve as claimed in claim 9, wherein a face (c) of the second piston in fluid communication with the control port is arranged such that force of fluid against said face acts on the spool in an axial direction toward the electromagnetic actuator.

11. The solenoid spool valve as claimed in claim 10, wherein the spool is arranged such that, a combined force on the spool from fluid against piston faces of the spool is independent of a transverse extent of the first piston, owing to equal and opposite face surface areas of the first piston.

12. The solenoid spool valve as claimed in claim 11, wherein the first piston has one piston face (b) in fluid communication with the control pressure port arranged such that force of fluid against said one piston face (b) acts on the spool in an axial direction away from the electromagnetic actuator, and an opposite piston face (a) in fluid communication with a feedback orifice arranged such that force of fluid against said opposite piston face (a) acts on the spool in an axial direction toward the electromagnetic actuator, wherein the feedback orifice supplies fluid at the same control pressure as the control pressure port, wherein the feedback orifice is in fluid communication with the control pressure port, and wherein the first piston is cylindrical and the combined force on the spool from fluid against said opposite piston face (a), said piston face (b) and said piston face (c) of the second piston of the spool is independent of an outside diameter of the first piston.

13. The solenoid spool valve as claimed in claim 12, wherein the spool is arranged such that, the combined force on the spool from fluid against piston faces of the spool is given by the equation:

$$\text{combined force} = A + C - B,$$

where A, B and C are, respectively, the fluid forces acting on said opposite piston face (a), said piston face (b) and said piston face (c) of the second piston.

14. A range of solenoid spool valves, each of which is as claimed in claim 1, wherein each of the solenoid spool valves has a different first piston diameter to second piston diameter ratio to provide different pressure capabilities, and wherein each of the solenoid spool valves having their own said electromagnetic actuator, wherein said electromagnetic actuator is identical for each of said spool valves.

15. The solenoid spool valve as claimed in claim 1, wherein the sensor further includes one or more of the following sensor types:
 a flow sensor;
 a temperature sensor;
 a speed sensor; and
 a position sensor;
 wherein the pressure control value further comprises one or more of a control flow value, a control temperature value, a control speed value and a control position value; and
 wherein the pressure request further comprises one or more of a flow request, a temperature request, a speed request and a position request.

16. The solenoid spool valve as claimed in claim 1, wherein the controller is arranged to receive the pressure request from one or more of the following communication types: CAN, CAN-Over-Power, radio links, or Bluetooth.

17. A self-compensating solenoid spool valve for delivering an output pressure to a hydraulic circuit responsive to a pressure request value received by the solenoid spool valve from a Controller Area Network (CAN), the solenoid spool valve comprising:
 a spool valve for altering the output pressure of the solenoid spool valve comprising a sleeve provided with a supply port, a control port, and a spool supported in the sleeve for axial displacement within the sleeve;
 an electromagnetic actuator adapted to drive the spool in a first axial direction in response to receiving a current;
 a pressure sensor arranged to sense a pressure control value of the spool valve; and
 a controller adapted to receive the pressure request value from the CAN, to obtain the pressure control value from the pressure sensor, and to control the current delivered to the electromagnetic actuator;
 wherein the solenoid spool valve is in the form of a module, including the spool valve, the actuator, the pressure sensor and the controller;
 wherein, in response to receiving the pressure request value from the CAN, the controller obtains the pressure control value from the pressure sensor and delivers current to the electromagnetic actuator to move the spool in the first axial direction until the pressure control value equals the pressure request value; and
 wherein, the controller compensates for wear in the spool valve by adaptively learning the current delivered to the electromagnetic actuator in relation to the pressure control value obtained from the pressure sensor.

* * * * *

UNITED STATES PATENT AND TRADEMARK OFFICE
CERTIFICATE OF CORRECTION

PATENT NO. : 10,975,978 B2
APPLICATION NO. : 16/102131
DATED : April 13, 2021
INVENTOR(S) : Tamba It is certified that error appears in the above-identified patent and that said Letters Patent is hereby corrected as shown below:

In the Claims

Column 11, Claim 4, Line 13, delete "claim 1," and insert --claim 3,-- therefor.

Column 11, Claim 12, Line 63, delete "said piston face" and insert --said one piston face-- therefor.

Column 11, Claim 12, Line 63, after "and said", delete "piston".

Column 12, Claim 13, Line 7, delete "said piston face" and insert --said one piston face-- therefor.

Column 12, Claim 13, Line 8, delete "said piston face" and insert --said face-- therefor.

Signed and Sealed this
First Day of June, 2021

Drew Hirshfeld
*Performing the Functions and Duties of the*
*Under Secretary of Commerce for Intellectual Property and*
*Director of the United States Patent and Trademark Office*